(12) United States Patent  (10) Patent No.: US 7,967,283 B2
Cho  (45) Date of Patent: Jun. 28, 2011

(54) CLAMPING DEVICE OF MOVING CART

(75) Inventor: Jong Pil Cho, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 1058 days.

(21) Appl. No.: 11/540,814

(22) Filed: Sep. 29, 2006

(65) Prior Publication Data

US 2007/0224023 A1    Sep. 27, 2007

(30) Foreign Application Priority Data

Mar. 21, 2006  (KR) .................. 10-2006-0025793

(51) Int. Cl.
*B23Q 3/18*  (2006.01)

(52) U.S. Cl. ........................................ 269/58

(58) Field of Classification Search .................. 414/467, 414/401, 483, 431, 749.4, 350; 74/813 R, 74/814; 269/152, 289 R, 8, 55, 57, 58, 63, 269/67, 70; 116/284, 175
See application file for complete search history.

(56) References Cited

U.S. PATENT DOCUMENTS

| | | | | |
|---|---|---|---|---|
| 2,736,113 | A * | 2/1956 | Morrison | 40/505 |
| 3,037,545 | A * | 6/1962 | Klinger et al. | 72/426 |
| 3,815,452 | A * | 6/1974 | Wilhelmy | 82/117 |
| 4,006,518 | A * | 2/1977 | Rudolph et al. | 29/39 |
| 4,450,737 | A * | 5/1984 | Hitt | 82/137 |
| 4,457,193 | A * | 7/1984 | Matthey | 82/129 |
| 4,641,884 | A * | 2/1987 | Miyashita et al. | 297/284.1 |
| 5,241,875 | A * | 9/1993 | Kochanneck | 74/490.03 |
| 5,720,090 | A * | 2/1998 | Dawson, Jr. | 29/40 |
| 5,842,259 | A * | 12/1998 | Hardesty et al. | 29/48.5 A |
| 5,876,085 | A * | 3/1999 | Hill | 296/65.02 |
| 5,938,138 | A * | 8/1999 | Sumiyashiki | 242/382.2 |
| 6,007,040 | A * | 12/1999 | Matsumoto et al. | 248/429 |
| 6,091,041 | A * | 7/2000 | Lai | 219/69.11 |
| 6,397,728 | B1 * | 6/2002 | Barber | 92/88 |
| 6,592,322 | B2 * | 7/2003 | Yang et al. | 414/663 |
| 6,758,117 | B2 * | 7/2004 | Baumann et al. | 82/117 |
| 6,857,702 | B2 * | 2/2005 | Becker et al. | 297/341 |
| 6,901,829 | B2 * | 6/2005 | Wu | 82/121 |
| 7,206,658 | B2 * | 4/2007 | Hiramoto et al. | 700/179 |
| 2003/0029285 | A1 * | 2/2003 | Wirth et al. | 82/117 |
| 2004/0075324 | A1 * | 4/2004 | Rausch et al. | 297/341 |
| 2005/0096778 | A1 * | 5/2005 | Hiramoto et al. | 700/179 |

* cited by examiner

*Primary Examiner* — Saúl J Rodríguez
*Assistant Examiner* — Glenn Myers
(74) *Attorney, Agent, or Firm* — Morgan, Lewis & Bockius LLP

(57) ABSTRACT

A clamping device of a moving cart includes a clamp rotatably provided in a moving cart frame and including a plurality of locaters that vary with the kinds of vehicles for which the moving cart is being used, a positioning device slidingly provided in the moving cart frame to determine the position of the clamp, and an actuator selectively coupled with the clamp and the positioning device to rotate the clamp or to linearly move the positioning device. The clamp may includes a polygonal plate with locaters provided on its edges. Display units for displaying the kinds of vehicles are attached to the locaters. The actuator includes a sensor for sensing the display units.

13 Claims, 2 Drawing Sheets

CLAMPING DEVICE OF MOVING CART

CROSS-REFERENCE TO RELATED APPLICATION

This application claims priority to and the benefit of Korean Patent Application No. 10-2006-0025793 filed in the Korean Intellectual Property Office on Mar. 21, 2006, the entire contents of which are incorporated herein by reference.

BACKGROUND OF THE INVENTION

1. Field of the Invention

The present invention relates to a clamping device of a moving cart, and more particularly, to a clamping device of a moving cart in which a plurality of locaters are provided in a plate and the plate is rotated or linearly moved such that the moving cart is compatible with several kinds of vehicles.

2. Description of the Background Art

Tens of thousands of parts are assembled in all assembly lines to produce a vehicle. A conventional assembly line moving cart includes a moving cart frame on both sides of which a plurality of rollers are mounted, a locater mounted in the moving cart frame by a fixing bracket, and a clamper provided in the locater.

The conventional moving cart is only compatible with one kind of vehicle. Therefore a moving cart must be newly manufactured for each kind of vehicle. This is costly and takes time.

SUMMARY OF THE INVENTION

Exemplary embodiments of the present invention provide a clamping device of a moving cart including a clamp rotatably provided in a moving cart frame and including a plurality of locaters that vary with the kinds of vehicles for which the moving cart is being used, a positioning device slidingly provided in the moving cart frame to determine the position of the clamp, and an actuator selectively coupled with the clamp and the positioning device to rotate the clamp or to linearly move the positioning device.

The clamp includes a polygonal plate that is rotatably provided around a shaft mounted in the moving cart frame with locaters provided on the edges of the plate. The plate includes a first coupling pin detachably coupled with the actuator.

The positioning device includes a fixing frame fixedly mounted in the moving cart frame and having a plurality of positioning grooves, a positioning member provided in a supporting frame formed to support the plate and engaged with one of the positioning grooves, and a guide rail for guiding the sliding motion of the supporting frame.

An elastic member for elastically supporting the up and down motion of the positioning member is provided between the supporting frame and the positioning member.

The positioning member includes a second coupling pin detachably coupled with the actuator.

The actuator includes a holder in which a coupling groove is coupled with the first and second coupling pins and a driving unit for rotating or linearly moving the holder.

The clamp further includes a moving member for moving the plate up and down from the supporting frame.

The locaters are provided on some of the edges of the plate and coupling grooves are provided on the remaining edges.

The moving member includes a coupler having a shape corresponding to the shape of the coupling grooves to be inserted into one of the coupling grooves and an operative cylinder for moving the coupler up and down.

Display units for displaying the kinds of vehicles are attached to the locaters. The actuator includes a sensor for sensing the display units.

The display units have different colors and the sensor is a camera that distinguishes the display units from each other.

DETAILED DESCRIPTION OF PREFERRED EMBODIMENTS

A preferred embodiment of the present invention will be described in detail with reference to the accompanying drawings.

Figure 1:
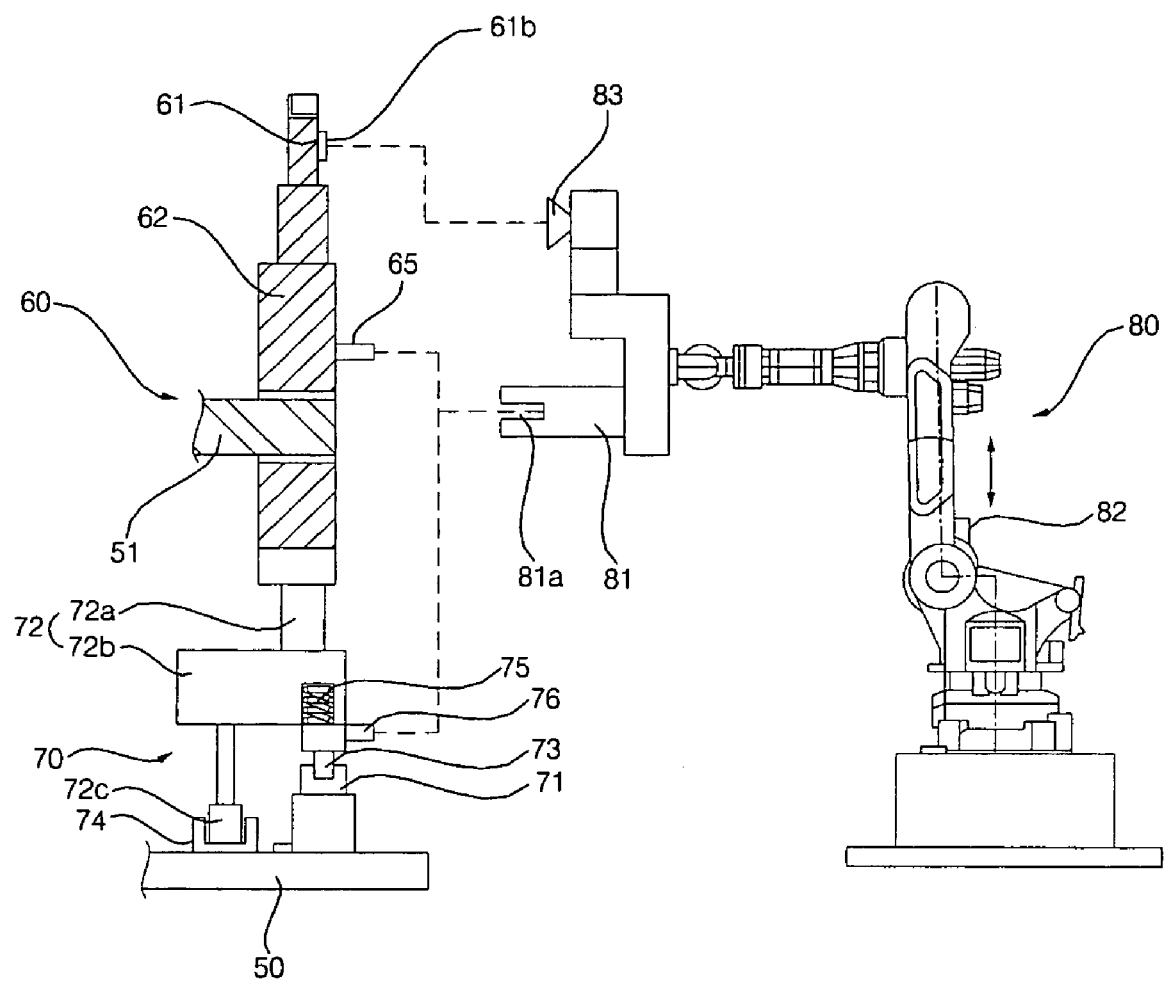
FIG. 1 is a side view illustrating a clamping device of a moving cart according to exemplary embodiments of the present invention.
Figure 2:
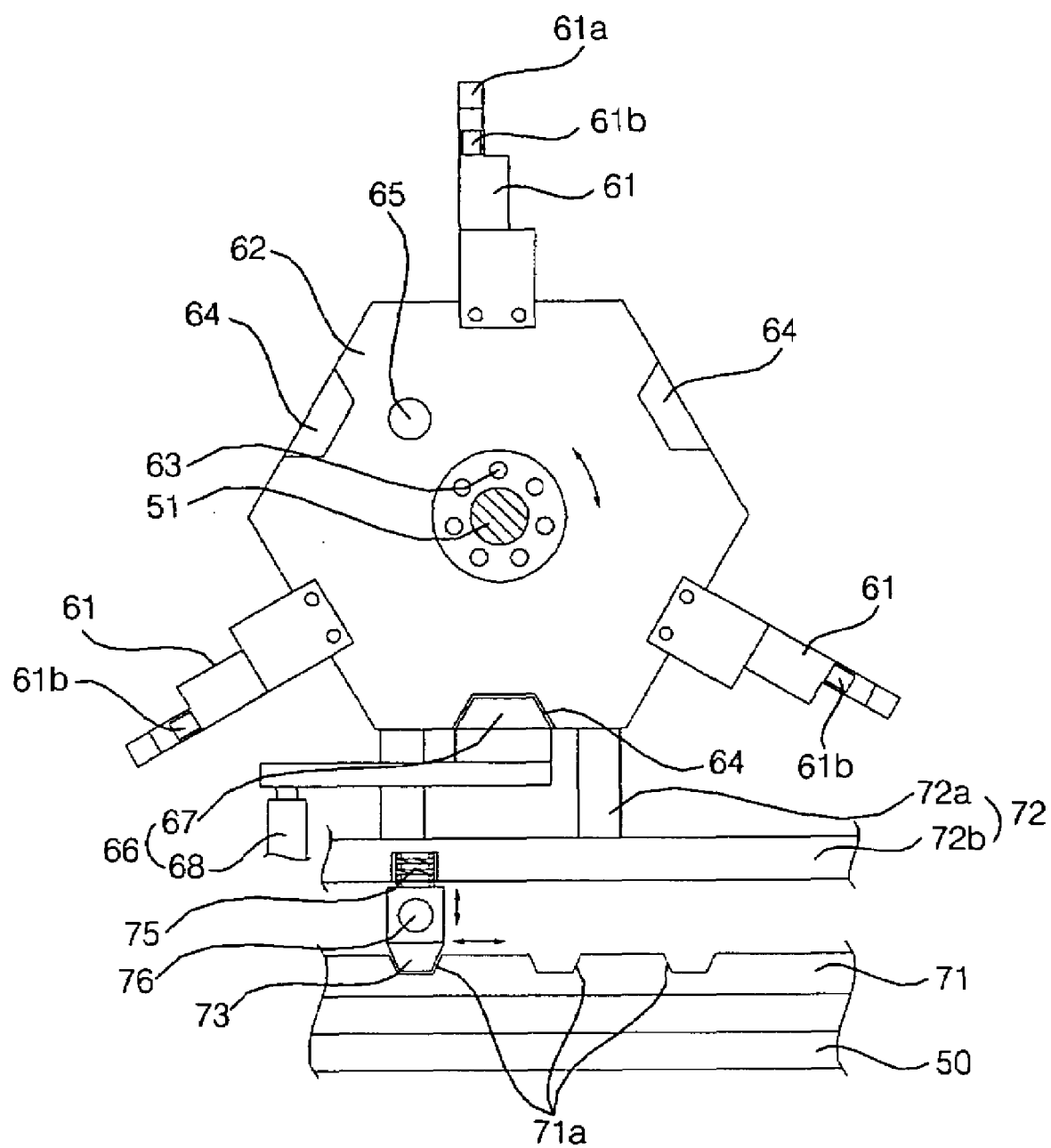
FIG. 2 is a front view illustrating a clamp according to exemplary embodiments of the present invention.

As illustrated in FIGS. 1 and 2, the clamping device of the moving cart according to exemplary embodiments of the present invention includes clamp 60 rotatably provided in a moving cart frame 50 and including a plurality of locaters 61 that vary with the kinds of vehicles for which the moving cart is being used, a positioning device 70 slidably provided in the moving cart frame 50 to determine the position of the clamp 60, and actuator 80 selectively coupled with the clamp 60 and the positioning device 70 to rotate the clamp 60 or to linearly move the positioning device 70.

Referring to FIG. 2, the clamp 60 includes a plate 62 rotatably provided around a shaft 51 that is mounted in the moving cart frame 50. Plate 62 is polygonal, and locaters 61 are provided on edges of plate 62.

Bearings 63 are mounted between the shaft 51 and the plate 62 so that the plate 62 smoothly rotates.

In an exemplary embodiment, plate 62 is hexagonal and three locaters 61, each corresponding to a different kind of vehicle are mounted on three of the six edges of plate 62. Coupling grooves 64 are provided on the remaining three edges. The locaters 61 and the coupling grooves 64 are each disposed on every other edge of the plate 62. The locaters 61 include locater pins 61a on ends thereof.

A first coupling pin 65 detachably coupled with the actuator 80 is provided on the front surface of the plate 62. The first coupling pin 65 is cylindrical and protrudes toward the actuator 80.

The clamp 60 further includes a moving member 66 for moving the plate 62 up and down. The moving member 66 includes a coupler 67 having a shape corresponding to the shape of the coupling grooves 64 to be inserted into one of the coupling grooves 64 and an operative cylinder 68 for moving the coupler 67 up and down.

The positioning device 70 includes a fixed frame 71 fixedly mounted in the moving cart frame 50 and having a plurality of positioning grooves 71a, a positioning member 73 provided in a supporting frame 72, which supports the plate 62, the positioning member 73 being engaged with one of the positioning grooves 71a, and a guide rail 74 (FIG. 1) for guiding the sliding motion of the supporting frame 72. The three positioning grooves 71a correspond to different kinds of vehicles.

The supporting frame 72 includes vertical supporting frames 72a that are vertically aligned to directly support the plate 62 and a horizontal supporting frame 72b that is aligned to be perpendicular to the vertical supporting frames 72a and under which the positioning member 73 is mounted. A guider 72c (FIG. 1) is mounted under the horizontal supporting frame 72b to slide along the guide rail 74.

An elastic member 75 for elastically supporting the up and down motion of the positioning member 73 is provided between the horizontal supporting frame 72b and the positioning member 73. The elastic member 75 may be a coil spring.

The positioning member 73 includes a second coupling pin 76 detachably coupled with the actuator 80 (FIG. 2). The shape of the second coupling pin 76 is the same as the shape of the first coupling pin 65.

The actuator 80 includes a holder 81 having a coupling groove 81a configured to be coupled with the first and second coupling pins 65 and 76, and a driving unit 82 for rotating or linearly moving the holder 81.

The driving unit 82 includes a plurality of arms connected to the holder 81 to rotate or linearly move the holder 81.

Display units 61b for displaying the kinds of vehicles are attached to the plurality of locaters 61. A sensor 83 for sensing the display units 61b is provided in the actuator 80.

In exemplary embodiments, the display units 61b of the locaters 61 have different colors. The sensor 83 is a camera that distinguishes the display units 61b from each other.

A controller (not shown) for controlling the operation of the actuator 80 is further provided. The controller may comprise a processor, memory, and associated hardware, software, and/or firmware as may be selected and programmed by a person of ordinary skill in the art based on the teachings of the present invention.

A method of operating the moving cart according to the present invention of the above structure will be described as follows.

First, when the moving cart enters, the sensor 83 of the actuator 80 checks the display unit 61b of the locater 61 positioned on the plate 62.

When it is determined that the color sensed by the sensor 83 of the actuator 80 is different from the color of the corresponding kind of vehicle, the controller (not shown) operates the driving unit 82 of the actuator 80 so that the second coupling pin 76 is inserted into the holder 81 of the actuator 80, and lifts the second coupling pin 76. The positioning member 73 is thus taken out of the positioning groove 71a corresponding to the previous vehicle.

Then, the positioning member 73 is inserted by the elastic member 75 into the positioning groove 71a corresponding to the corresponding vehicle. The position of the plate 62 changes accordingly as the positioning member 73 moves.

Then, when the operative cylinder 68 of the moving member 66 is operated, the coupler 67 moves downward out of the coupling groove 64, allowing the plate 62 to rotate.

Then, the driving unit 82 of the actuator 80 is operated so that the first coupling pin 65 is inserted into the holder 81 of the actuator 80. The driving unit 82 of the actuator 80 moves the plate 62 upward, and then rotates the plate 62 to a specific location at which the locater 61 that corresponds to the corresponding vehicle is positioned at the top position, as seen in FIG. 1.

Then, the operative cylinder 68 is operated so that the coupler 67 is inserted into the coupling groove 64 so that plate 62 cannot rotate.

Since the locaters are provided on one plate so that the moving cart is compatible with more than one kind of vehicle, stand-by space, time, and cost caused by manufacturing a new moving cart for each vehicle are reduced.

While this invention has been described in connection with what is presently considered to be the most practical and preferred embodiments, it is to be understood that the invention is not limited to the disclosed embodiments, but, on the contrary, is intended to cover various modifications and equivalent arrangements included within the sprit and scope of the appended claims.

What is claimed is:

1. A clamping device of a moving cart comprising:
    a clamp rotatably provided in a moving cart frame and including a plurality of locaters, each of the locaters corresponding to a different vehicle;
    a positioning device slidingly provided in the moving cart frame to determine the position of the clamp; and
    an actuator selectively coupled with the clamp and the positioning device to rotate the clamp or to linearly move the positioning device,
    wherein the clamp comprises a plate that is formed in a substantially polygonal shape and is rotatably provided around a shaft mounted in the moving cart frame and each locator is disposed on an edge thereof, and
    wherein the positioning device comprises:
    a fixing frame fixedly mounted in the moving cart frame and having a plurality of positioning grooves;
    a positioning member provided in a supporting frame to support the plate and engaged with one of the positioning grooves ; and
    a guide rail for guiding sliding motion of the supporting frame.

2. The clamping device for the moving cart as claimed in claim 1, wherein the plate comprises a first coupling pin detachably coupled with the actuator.

3. The clamping device of the moving cart as claimed in claim 1, wherein an elastic member for elastically supporting up and down motion of the positioning member is provided between the supporting frame and the positioning member.

4. The clamping device of the moving cart as claimed in claim 1, wherein the positioning member comprises a second coupling pin detachably coupled with the actuator.

5. The clamping device of the moving cart as claimed in claim 4, wherein the actuator comprises:
    a holder comprising a coupling groove configured to be coupled with the first and second coupling pins; and
    a driving unit for rotating or linearly moving the holder.

6. The clamping device of the moving cart as claimed in claim 1, wherein the clamp further comprises a moving member for moving the plate up and down from the supporting frame.

7. The clamping device of the moving cart as claimed in claim 6,
    wherein the locaters are provided on at least one edge of the plate, and coupling grooves are disposed on at least another edge of the plate.

8. The clamping device of the moving cart as claimed in claim 7, wherein the moving member comprises:
    a coupler having a shape configured to be inserted into one of the coupling grooves; and
    an operative cylinder for moving the coupler up and down.

9. The clamping device of the moving cart as claimed in claim 1, wherein each locator comprises a display unit for displaying a kind of vehicle.

10. The clamping device of the moving cart as claimed in claim 9, wherein the actuator comprises a sensor for sensing the display units.

11. The clamping device of the moving cart as claimed in claim 10 wherein the sensor comprises a camera that distinguishes the display units from each other.

12. The clamping device of the moving cart as claimed in claim 11 wherein the display units comprise different colors.

13. A clamping device of a moving cart comprising:
a clamp rotatably provided in a moving cart frame and including a plurality of locaters, each of the locators corresponding to a different vehicle;
a positioning device provided in the moving cart frame to determine the position of the clamp;
an actuator selectively coupled with the clamp and the positioning device to rotate the clamp or to linearly move the positioning device; and
a moving member for moving a plate up and down from the supporting frame,
wherein the clamp comprises the plate that is formed in a substantially polygonal shape and is rotatably provided around a shaft mounted in the moving cart frame and each locator is disposed on an edge thereof, and
wherein the positioning device comprises:
a fixing frame fixedly mounted in the moving cart frame and having a plurality of positioning grooves;
a positioning member provided in the supporting frame to support the plate and engaged with the one of the positioning grooves; and
a guide rail for guiding sliding motion of the supporting frame.

* * * * *